A. A. WOOD.
COTTON SEED DELINTING SAW.
APPLICATION FILED AUG. 3, 1914.

1,239,998.

Patented Sept. 11, 1917.

INVENTOR.
Albert A. Wood

UNITED STATES PATENT OFFICE.

ALBERT A. WOOD, OF ATLANTA, GEORGIA.

COTTON-SEED-DELINTING SAW.

1,239,998.         Specification of Letters Patent.    Patented Sept. 11, 1917.

Application filed August 3, 1914. Serial No. 854,716.

*To all whom it may concern:*

Be it known that I, ALBERT A. WOOD, a citizen of the United States, and a resident of Atlanta, in the county of Fulton and State of Georgia, have invented a certain new and useful Improvement in Cotton-Seed-Delinting Saws, of which the following is a description.

This invention relates to a new shape of teeth for removing the lint from cotton-seed after the same has had removed therefrom the long lint or the cotton of commerce, said delinting being specifically the cutting from the seed of the "stumps" of the fiber so as to render the seed ready for the process of extracting the oil from the meats or kernels thereof, said stumps being very difficult of removal owing to fact that no intimate hold may be taken thereon and the fibers being interlaced or matted together strongly and rooted in or adhered to the exterior, hard coating of the seeds. These "linters" as these short fibers are called after removal from the seed have a considerable market value and it is hence very desirable that they be removed from the seed with as little cutting or chopping up (shortening) as possible and as free as possible from cut-off particles of the seed-hull. Obviously it is also desirable that none of the seeds be cut, split or opened in the delinting process and that the same be delivered from the delinting machine in such condition that they may be readily divested of their outer shell or hull and be free from this short lint which, besides adhering to the crushed meats also causes the matting of the hulls in the separator and the passing out with themselves of considerable oil-bearing finer particles of meats and several other objections well-known in the art.

From the beginning of the art of cotton-ginning, that is the removal of the cotton of commerce, a substantially constant use has been made of a saw having a tooth substantially circular in cross-section and in the incipiency of the oil-extracting art as applied to cotton-seed, this same form of tooth was applied to the aforesaid delinting of the seed and no serious attempt has heretofore been made to improve the very imperfect delinting by such teeth excepting to assemble the saws on their mandrel with a lesser interval between them which interval is limited in its reduction by the practical distance required within which to insert the rib, of which there is one between each contiguous pair of saws and which together form the grid of the gin or delinter. This tooth is formed by thinning the edge of the saw by beveling or chamfering on each side near the edge and then producing the circular cross-sectional shape by filing the angles formed on each tooth by this chamfering. This tooth enters the mat of short fibers but does not remove them from the seed with practical rapidity or thoroughness, as its effect is merely to comb or card the short matted lint on the seed and only to remove that lint which comes away freely or is broken by the tooth or otherwise a short distance away from its actual point of joinder to the hull, and, further, such little as might be scratched off by the point of the tooth in contact with the hull. This obviously leaves the surface of the seed more or less furry and only partially delinted. The present improvement in the shape of these teeth has been thoroughly tested and obviates all of these difficulties, the reasons of which will be fully explained after an exposition of the nature of the improvements.

In the accompanying drawings.

The same features are marked with corresponding reference characters in all the views.

Figure 4:
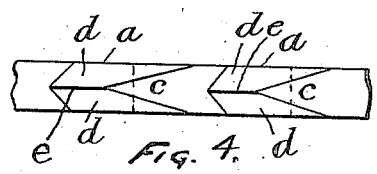
Fig. 4 is an edge view thereof.
Figures 1, 2:
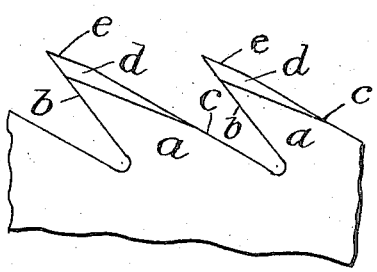
Figure 1 is a portion of the disk or "saw" showing two of the improved teeth in side-elevation, very much enlarged.
Figs. 2 and 3 are end views.
Figure 3:
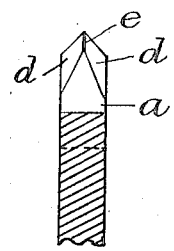

While the exact angles may be regarded as immaterial, for purposes of comparative description it will be assumed that the tooth $a$ is bounded by a front at $b$ the angle of which to the saw radius touching the point of the tooth is about 39° and a back $c$, the angle of which to the same radius is about 62°, making a tooth the sides of which converge from the root outwardly at an included angle of 23° approximately. By reason of the difference in angle to its two sides, this "front" and "back," to the said radius the tooth inclines forwardly as the saw runs in operation. It is the best practice to have the front $b$ of the tooth at such an angle that as it approaches the ribs of the grid it also approaches parallelism with the contiguous face thereof so that the fibers carried in the interdental space between the ribs is neither by the angle of this front $b$ packed into said space, nor is there a tendency to force them from the tooth, at any time before the brush or suction is applied to take the said fibers from the saws. With these premises it is considered immaterial exactly what the angle of the tooth is so long as it is capable of taking the fiber upon its front b and carrying it through the grid and is of sufficient strength to be practicable.

The present invention consists in a tooth on which has been produced by filing or otherwise on its back c extending backwardly from its point, facets d which lie at an angle to each other so that a ridge e is formed along their intersection, said facets d lying at an acute angle longitudinally to the hereinbefore mentioned radius of the saw. By the conjunction of these facets d and the front b of the tooth and angular position of these facets d both correlatively and to the radius a sharp, triangular point is formed upon the tooth a while extending from this extreme point to the sides of the saw (the width of the facets) are sharp, cutting edges. In other words, these cutting edges converge from the sides of the saw along the point of the tooth terminating in a triangular point proper. It is preferable that the included angle of these cutting edges should not be acute as thereby a stronger point will be obtained. Were this angle acute the points would be too slender and the cutting edges which enter the matted fibers and cut would be unnecessarily long. The angle at which these facets d lie to a tangent touching the point of the tooth is such that these cutting edges at the point are presented in the lead of the heels of the said facets, that is, said facets and their conjoint angle e are "raking" and as the sharp, triangular points of the teeth enter the closely matted lint on the seed to which entry they are assisted by the cutting divergent edges at the tooth-point they penetrate to contact with the seed and commence cutting the lint therefrom, the retardation of the roll of seed causing these points to be dragged over the seed in somewhat forcible contact therewith, the seed being held in contact with the point of the tooth with its cutting edges by the matted fiber and the rake of the tooth. The front b of the tooth where it coincides with the sides of the saw forms a rectangular corner around which the short fiber is wrapped and by which it is sufficiently engaged to insure its being carried through the grid and not easily wiped off by contact with other seed as is the case with the tooth circular in cross-section. Thus a very much diminished quantity of free fiber remains in the roll to be cut and broken by the teeth or to fall out with the delinted seed.

In order to sharpen the tooth having the circular cross-section it is necessary to reshape the teeth and bring them to a point the operation being substantially the same as their initial forming while in the case of this improved tooth a little filing upon the plane front b is all that is required to restore the same to proper working form, as owing to the conjunction of this plane front b with the parallel sides of the tooth and the front border of the facets d and the ridge or rib e formed by their coincidence, working sharpness is provided by simply removing a little metal from the front b.

It will be noted that the formation of the teeth with the faces specified involves certain construction, namely, that portions d have acute and obtuse angles at their upper and lower edges, and that the cutting portion of the teeth is formed on a base having parallel sides located between the cutting portion and the body of the saw. The heavy base with a triangular side constitutes a firm support for the long tapering teeth, necessarily leaving an interval of corresponding length between the teeth.

I claim:

1. In a delinting saw, a tooth formed as a triangular pyramid touching the outer circumferential line of the teeth only at its apex.

2. In a delinting saw, a tooth having a substantially plane forward side and a rearward side formed of planes arranged at an angle to each other and to the forward side of the tooth, and producing a rib disposed at an angle to a circumference.

3. In a delinting saw, a tooth having a substantially plane forward side disposed at an angle to a radius and a rearward side having a central rib disposed at an angle to a radius and to the circumference.

4. In a delinting saw, a tooth having a substantially plane forward side with its rearward side beveled to form with the forward side a point, it being the only part of the tooth touching the circumference of the saw.

5. In a delinting saw, a tooth having a substantially plane forward side disposed at an angle to a radius; a rearward side disposed at a greater angle to and upon the same side of the radius as the forward side; and side bevels producing a point, it being the only part of the tooth touching the circumference.

6. In a delinting saw, a tooth having a substantially plane forward side disposed at an angle to a radius; a rearward side disposed at an angle to and greater than the angle of the forward side upon the same side of the radius and meeting the forward side; and bevels producing a point at the meetings between the rearward and forward sides.

7. In a delinting saw, a tooth formed as a triangular pyramid touching the outer circumferential line of the teeth only at its apex, the distance between two of the opposing sides of the teeth being uniform at all points on any given line parallel with the base of the planes forming said sides.

8. In a delinting saw, a tooth having a substantially plane forward side and a rearward side formed of planes arranged at an angle to each other and to the forward side of the tooth, and producing a rib disposed at an angle to a circumference, the sides of the base of the tooth forming parallel planes between the body of the saw and the planes first mentioned.

9. In a delinting saw, a tooth the base portion of which is of uniform thickness, each side of the base having approximately the form of a triangle and the upper portion of the tooth being beveled on each side to form a surface having sides forming respectively an obtuse angle and an acute angle with a line coinciding with the meeting edges of the sides of the body and the sides of said upper portion.

In testimony whereof, I hereunto set my hand in the presence of two subscribing witnesses.

ALBERT A. WOOD.

Witnesses:
 EDW. S. WOOD,
 STERLING I. MELVIN.

Copies of this patent may be obtained for five cents each, by addressing the "Commissioner of Patents, Washington, D. C."